United States Patent [19]
Holwerda

[11] Patent Number: 5,483,028
[45] Date of Patent: Jan. 9, 1996

[54] ACOUSTICAL BARRIER WITH DECOUPLER

[75] Inventor: Matthew J. Holwerda, Hudsonville, Mich.

[73] Assignee: Cascade Engineering, Inc., Grand Rapids, Mich.

[21] Appl. No.: 338,437

[22] Filed: Nov. 14, 1994

[51] Int. Cl.⁶ ........................................................ F16F 7/00
[52] U.S. Cl. ............................................. 181/207; 181/290
[58] Field of Search ......................................... 181/207, 208, 181/286, 290

[56] References Cited

U.S. PATENT DOCUMENTS 4,705,139  10/1987  Gahlau et al. ............................ 181/290
4,735,284   4/1988  Gahlau et al. ............................ 181/290
4,867,271   9/1989  Tschudin-Mahrer ...................... 181/290

Primary Examiner—Khanh Dang
Attorney, Agent, or Firm—Varnum, Riddering, Schmidt & Howlett

[57] ABSTRACT

An acoustic barrier for mounting to a barrier wall, such as a barrier wall between an engine compartment and a passenger compartment of a vehicle. The barrier wall has multiple indentations forming an uneven surface. The acoustic barrier comprises a decoupling layer and a mass layer. The mass layer has a series of projections formed on a rear surface, which coincide with the indentations of the barrier. When the decoupling layer is mounted to the rear wall of the mass layer, the projections alter the shape of the decoupling layer to conform with the shape of the barrier layer.

16 Claims, 1 Drawing Sheet

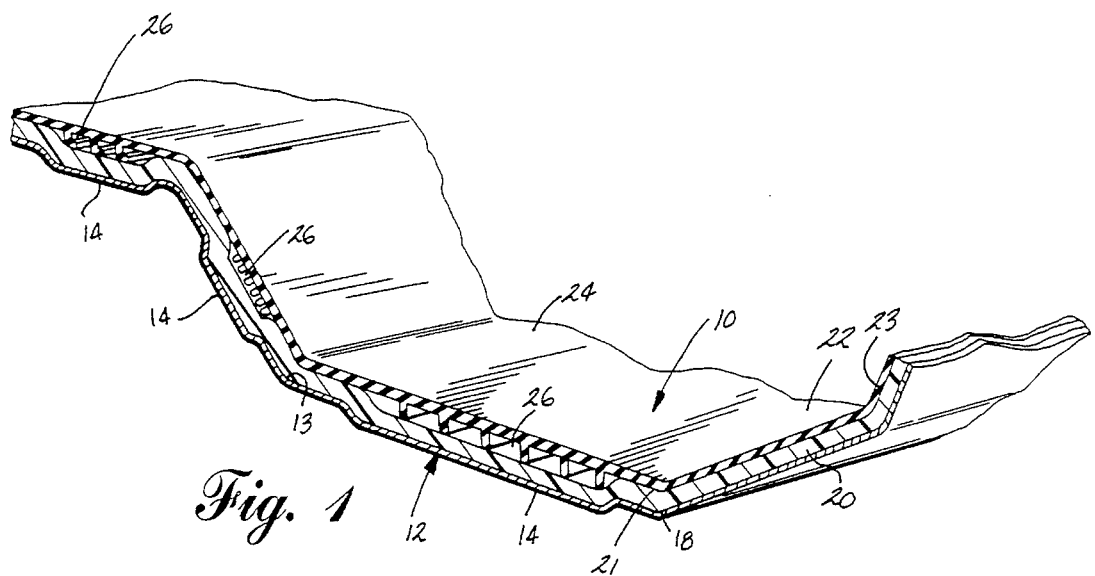
Fig. 1
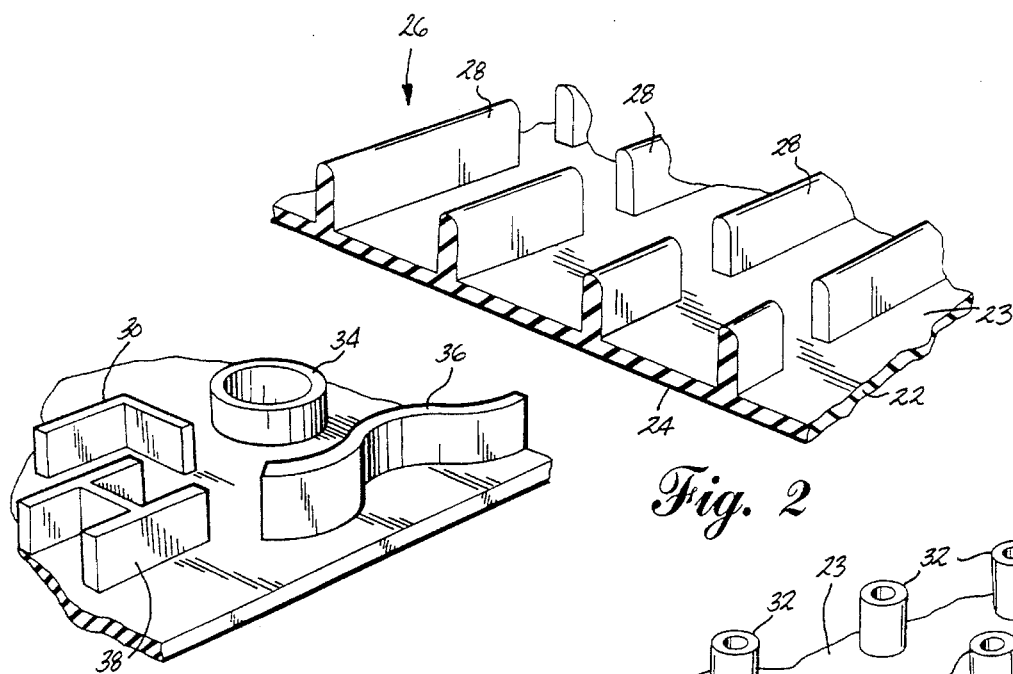
Fig. 2
Fig. 3
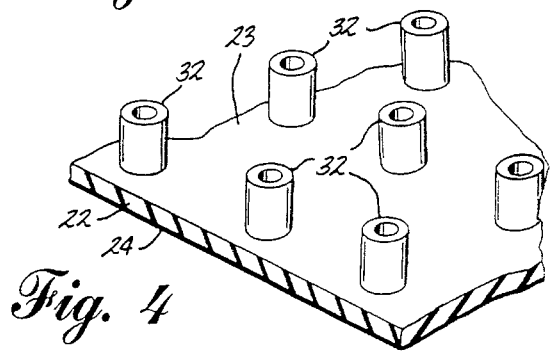
Fig. 4

ACOUSTICAL BARRIER WITH DECOUPLER

BACKGROUND OF THE INVENTION

1. Field of the Invention

This invention relates to an acoustical barrier for reducing the transfer of sound through a panel member; and more specifically, to a wall-mounted acoustical barrier with a decoupler for separating the acoustical barrier from the panel to enhance the sound reducing properties of the acoustical barrier.

2. Description of Related Art

Acoustical barriers are commonly used in contemporary motor vehicles to reduce the engine and road noise. Most vehicles have a sheet metal barrier wall between the engine compartment and the passenger compartment, physically separating the engine compartment and the passenger compartment. Unfortunately, the metal barrier wall readily transmits sound from the engine compartment into the passenger compartment.

Previous acoustical barriers have been constructed to reduce or eliminate the sound transfer through the barrier wall. One of these prior acoustic barriers generally comprises a foam or other decoupling layer and a mass layer, both of which are sheets coextensive with the barrier wall. The foam layer and mass layer are bonded together and the acoustic barrier is mounted to the barrier wall so that the foam layer is positioned against the barrier wall within the passenger compartment. The foam layer serves to separate or decouple the mass layer from the barrier wall to minimize the direct transfer of sound vibrations through the mass layer.

In order to maximize sound decoupling, the decoupling layer should have a predetermined thickness. Also, the mass layer should present a smooth appearance in order to provide a surface on which carpets and other materials can be mounted within the vehicle passenger compartment. The barrier wall typically has multiple curves and indentations, resulting in uneven barrier wall surfaces, making it difficult to conform the decoupling layer to the barrier wall, while maintaining a smooth mass layer. Previous acoustic barriers have solved the problem of conforming the decoupling layer to the barrier wall while presenting a smooth exterior mass layer by making the decoupling layer of a thickness that is the sum of the maximum depth of the indentations plus a minimum desired decoupling layer thickness. Portions of the decoupling layer corresponding to the unrecessed areas of the barrier wall are compressed so that the one side of the decoupling layer conforms to the surface of the barrier wall, including portions protruding into the indentations, while the other side remains a smooth surface. The mass layer is then mounted to the smooth surface of the decoupling layer.

Although the previous solution is acceptable, excess decoupling material must be used and the decoupling layer compressing step is an extra process step, thereby increasing the cost of the decoupler. The present invention relates to an acoustical barrier that minimizes the amount of decoupling material in the decoupler and eliminates the decoupling layer compression step. The invention results in a novel solution to the physical and aesthetic problems associated with previous acoustic barriers, while substantially reducing the material and production costs.

SUMMARY OF INVENTION

The invention relates to an acoustical barrier that is adapted to mount to a barrier wall having at least one indentation. The acoustical barrier comprises a mass layer and a decoupling layer. The mass layer is of a molded construction, sound dampening characteristics and is adapted to dampen the transfer of sound across the barrier wall. The mass layer has an upper surface, which is relatively planar, and a lower surface, which is generally planar with at least one area of spaced projections. The decoupling layer is of relative uniform thickness and has an inner surface, which is in facing relationship to the lower surface of the mass layer. The at least one area of spaced projections forces the decoupling layer away from the lower surface of the mass layer to form a protrusion on an outer surface of the foam layer, which is adapted to conform to the at least one layer of indentation of the barrier wall. The decoupling layer is preferably a foam material.

The mass layer of the acoustical barrier is injection molded of a thermoplastic material. The projections of the mass layer can have a variety of shapes, such as elongate projections, projections that are L-shaped in cross section, and tubular projections. The mass layer can also have multiple areas of projections. Each of the areas are adapted to correspond with an indentation on a barrier wall. The multiple areas of projections can have projections of different shapes.

The acoustical barrier according to the invention can be used in combination with a vehicle wherein the vehicle has a barrier wall separating the vehicle into at least two compartments and the acoustical barrier mounts to the barrier wall to dampen the transfer of sound between the two compartments.

BRIEF DESCRIPTION OF THE DRAWINGS

The invention will now be described with reference to the drawings wherein:

FIG. 1 is a perspective view of a portion of an acoustic barrier according to the invention;

FIG. 2 is a perspective view of a portion of a mass layer of the acoustic barrier shown in FIG. 1;

FIG. 3 is a perspective view similar to FIG. 2 of a second embodiment of a portion of the mass layer according to the invention; and FIG. 4 is a perspective view similar to FIG. 2 of a third embodiment of a portion of a mass layer according to the invention.

DESCRIPTION OF THE PREFERRED EMBODIMENTS

Referring now to the drawings and to FIGS. 1 and 2 in particular, an acoustic barrier 10 according to the invention is mounted to a barrier wall 12. The acoustic barrier 10 reduces or prevents the transfer of sound from one side of the barrier wall 12 to the other side. In a vehicle application, the barrier wall 12 can be a barrier wall between the engine compartment and a passenger compartment of the vehicle. The acoustic barrier 10 is generally mounted on the side of the barrier wall 12 that faces the passenger compartment and prevents the transfer of engine and road noise from the engine compartment to the passenger compartment. The acoustic barrier 10 can, however, be mounted to the side of the barrier wall that faces the engine compartment, or on any other vehicle or other type of wall.

Typically, the barrier wall 12 has an uneven surface 13 with multiple indentations 14 of various sizes and shapes. For purposes of simplicity, only a small portion of the barrier wall 12 and acoustic barrier 10 is shown. It should be understood that both the barrier wall 12 and the acoustic barrier 10 extend across the entire vehicle front and wheel wells. The barrier wall 12 has many indentations and bumps to accommodate the installation of various components on both sides of the wall 12. The indentations 14 are necessary and vehicle specific so that the barrier wall 12 can fit within and around other structural elements of a vehicle. The uneven surface 13 of the barrier wall 12 is aesthetically undesirable and the acoustic barrier 10 is shaped to even or smooth the surface facing the passenger compartment while performing the sound dampening function.

The acoustic barrier 10 according to the invention comprises a decoupling layer 20 and a mass layer 22. When the acoustic barrier 10 is mounted to the barrier wall 12, an outer surface 18 of the decoupling layer 20 abuts against and conforms to the uneven surface 13 of the barrier wall 12 and an inner surface 21 of the decoupling layer 20 abuts the mass layer to separate the mass layer 22 from the barrier wall 12 and decouples the transfer of sound between the barrier wall 12 and the mass layer 22. The decoupling occurs because the properties of the decoupling layer 20 are such that it does not readily vibrate or transfer sound when it is in direct contact with the barrier wall 12. The acoustic barrier 10 performs the sound dampening function best if the decoupling layer 20 is of a minimum predetermined thickness. The decoupling layer 20 is preferably a flexible foam, such as polyurethane, but other low density, insulating materials can be used.

The mass layer 22 is preferably made from rubber, modified polypropylene or other thermoplastic polymer filled with a sound deadener such as barium sulfate and is relatively dense. A lower surface 23 of the mass layer 22 abuts the inner surface 21 of the decoupling layer 20 when the acoustic barrier 10 is assembled. The mass layer has an upper surface 24 that is even and smooth. The lower surface 23 of the mass layer 22 abuts the decoupling layer 20 and has a series of projections 26 extending therefrom. The projections 26 are disposed on the lower surface 23 of the mass layer 22 so that they correspond to the location of the indentations 14 of the barrier wall 12 when the acoustic barrier 10 is mounted to the barrier wall 12. The projections 26 are sufficiently rigid so that the decoupling layer 20 will follow the contour of the lower surface of the mass layer 22 until it encounters the projections 26 where it moves away from the lower surface of the mass layer 22. The projections 26 present a surface that conforms to the shape of the barrier wall 12. Thus, the decoupling layer 20 is of uniform thickness and follows the contour of the barrier wall 12 and the lower surface of the mass layer 22 with substantially no compression. The decoupling layer 20 has a minimum and constant thickness, which is dictated by the specific sound absorbing requirements of a specific application, eliminating the need to compress portions of the decoupling layer 20. The projections 26 alter the contour of the decoupling layer 20 to coincide with the contour of the uneven surface 13 of the barrier wall 12 and hold the outer surface 18 of the decoupling layer 20 in abutting relationship with the uneven surface 13 of the barrier wall 12.

The projections 26 can have a variety of shapes depending on the particular application. FIGS. 2–4 illustrate some of the possible projection shapes. The projections can be elongated projections 28 (FIG. 2), L-shaped 30 projections, oval shaped 34, serpentine shaped 36 or H-shaped 38 (FIG. 3), or hollow cylindrical projections 32 (FIG. 4). Other shapes (not shown) include triangular or polyhedron. Further, the projections can be of different elevations to represent variations in cross-sectional thickness. The mass layer 22 can have projections 26 of all the same type or can combine a variety of different shapes of projections, depending on the particular application. It is also contemplated that the projections 26 for a particular indentation 14 can comprise a combination of different shaped projections 26 to properly conform the shape of the projections 26 to the shape of the indentation 14. Preferably, the mass layer 22 and the projections 26 are injection molded as a single piece. The number and size of projections in any given area is minimized to support the mass layer. Optimum decoupling is attained by minimizing the contact area between the mass layer and the decoupling layer.

The acoustic barrier 10 according to the invention conforms to the uneven surface of the barrier wall 12, forcing the decoupling layer 20 into substantially uniform contact with the barrier wall 12, while the exposed surface of the mass layer 22 presents a smooth, even and aesthetically pleasing surface to the interior of the passenger compartment. The acoustic barrier 10 uses substantially less material than previous acoustic barriers because the decoupling layer 20 can be of a minimum uniform thickness without compression of a portion of the decoupling layer to conform with the indentations of the barrier wall 12. The invention can save up to 50% of the decoupling material costs and eliminates a compression step. The use of less decoupling material is advantageous because the material and production costs of the decoupling layer are relatively more expensive than the material and production costs of the mass layer. Thus, the acoustic barrier 10 provides a less expensive and easier to manufacture acoustic barrier than previous accoustic barriers.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

The embodiments of the invention in which an exclusive property or privilege is claimed are defined as follows:

1. An acoustical barrier adapted to mount to a barrier wall having at least one indentation, the acoustical barrier comprising;

a mass layer having a molded construction and sound dampening characteristics, the mass layer having an upper surface, which is relatively planar, and a lower surface, which is generally planar with at least one area of spaced projections; and a decoupling layer of relatively uniform thickness having an inner surface in facing relationship to the lower surface of the mass layer and the at least one area of spaced projections forcing the decoupling layer away from the lower surface of the mass layer to form a protrusion on an outer surface of the decoupling layer, and the protrusion is adapted to conform to the at least one indentation of the barrier wall.

2. An acoustical barrier according to claim 1 wherein the mass layer is injection molded of a thermoplastic material.

3. An acoustical barrier according to claim 1 wherein the spaced projections are elongated.

4. An acoustical barrier according to claim 1 wherein the spaced projections are L-shaped in cross section.

5. An acoustical barrier according to claim 1 wherein the spaced projections are tubular.

6. An acoustical barrier according to claim 1 wherein the mass layer has multiple areas of projections adapted to correspond to a barrier wall with multiple indentations.

7. An acoustical barrier according to claim 6 wherein each of the multiple areas of projections have projections of different shapes.

8. An acoustical barrier according to claim 1 wherein the decoupling layer is made of a flexible foam.

9. A vehicle having a barrier wall with an acoustical barrier mounted thereto, the barrier wall separating the vehicle into at least two compartments and the acoustical barrier dampening the transfer of sound between the two compartments, the barrier wall comprising at least one indentation; and the acoustical barrier comprising:
a mass layer having a molded construction and sound dampening characteristics, the mass layer having an upper surface, which is relatively planar, and a lower surface, which is generally planar with at least one area of spaced projections; and
a decoupling layer of relatively uniform thickness having an inner surface in facing relationship to the lower surface of the mass layer and the at least one area of spaced projections forcing the decoupling layer away from the lower surface of the mass layer to form a protrusion on an outer surface of the decoupling layer, and the protrusion conforms to the at least one indentation of the barrier wall.

10. A vehicle according to claim 9 wherein the mass layer is injection molded of a thermoplastic material.

11. A vehicle according to claim 9 wherein the spaced projections are elongated.

12. A vehicle according to claim 9 wherein the spaced projections are L-shaped in cross section.

13. A vehicle according to claim 9 wherein the spaced projections are tubular.

14. A vehicle according to claim 9 wherein the barrier wall has multiple indentations and the mass layer has corresponding multiple areas of projections.

15. A vehicle according to claim 14 wherein each of the multiple areas of projections have projections of different shapes.

16. A vehicle according to claim 9 wherein the decoupling layer is a foam layer.

* * * * *